Patented Oct. 25, 1932                                              1,884,656

UNITED STATES PATENT OFFICE

HENRI CASPAR JOSEPH HUBERT GELISSEN, OF ROERMOND, NETHERLANDS, ASSIGNOR TO NAAMLOOZE VENNOOTSCHAP ELECTROCHEMISCHE INDUSTRIE, OF ROERMOND, NETHERLANDS, A DUTCH COMPANY

PROCESS FOR OBTAINING PHOSPHORUS-HALOGEN COMPOUNDS

No Drawing. Application filed December 11, 1928, Serial No. 325,391, and in the Netherlands December 22, 1927.

Heretofore raw phosphates have been attacked either by acids, for example, sulphuric acid or by conversion into metaphosphate and subsequent heating with carbon, or by heating the raw phosphate with silica and carbon at a very elevated temperature.

It has also been proposed to obtain phosphorus halogen compounds by treating the phosphate with chlorine in the presence of carbon or carbon monoxide or in the presence of both reducing agents.

It has now been found that the action of halogen, especially of chlorine, in reactions of this nature, may considerably be improved if they are carried out in the presence of catalyzers, owing to which the technical application of this reaction becomes not only possible, but also offers great advantages.

Thus it is found that several valuable phosphorus compounds may be obtained in quite a different way and at much lower temperature than that used in the last mentioned process, if phosphates, mixed with carbon or other reducing agents, are treated with chlorine or other halogens, with or without the addition to the halogen of a gaseous reducing agent, as, for example, carbon monoxide, and at temperatures from below a red heat up to a bright red-heat, by the use of catalyzers as given below. Since the reaction is exothermic, one needs only little heat for carrying on the conversion. It is advantageous to employ, as catalyzers, in the process, previously mixed with the tricalcium phosphate and carbon, chlorides of a metal such as copper or zinc (hereinafter referred to generically as chlorides of a brass-forming metal, since brass contains both copper and zinc).

The most important reaction which takes place, is perhaps as follows:—

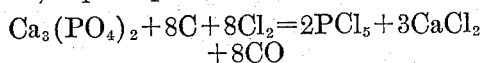

However also phosphorus trichloride (PCl₃) or phosphorus oxychloride (POCL₃) may be formed.

The present process has a special importance in the conversion of tricalcium phosphate with chlorine in the presence of carbon in which process besides CaCl₂ phosphorus-chlorine compounds or phosphorus-chlorine-oxygen compounds are formed, approximately according to the above equation.

The process according to the invention possesses considerable technical advantages. First the reaction takes place at a moderate temperature, and chlorine may be used for the conversion (a material the utilization of which often causes the industry much trouble); moreover, phosphorus compounds of a high value are obtained. The phosphorus-halogen compounds formed, for example, phosphorus pentachloride, phosphorus oxychloride, phosphorus trichloride and the like, may also be brought into reaction direct with ammonia gas or with an ammonia solution by which ammonium phosphate and ammonium chloride are formed.

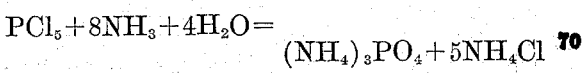

Some side reactions may also occur.

On the other hand the production of H₃PO₄ from phosphorus-halogen compounds is much simpler than the manufacture of the same acid from phosphorus itself.

*Example 1.*—A mixture of tricalcium phosphate with carbon in excess is dried and mixed with 5% of zinc chloride. This mixture is heated, for example to about 600° C., and exposed to a stream of chlorine. The reaction goes on very smoothly, forming phosphorus-chlorine compounds, which compounds distil over with the excess carbon monoxide, whereas calcium chloride remains back.

*Example 2.*—To a dry mixture of tricalcium phosphate with carbon in excess, 5% of cupric chloride (more or less) is added. The mixture is dried. In the same way as described in the first example chlorine is conducted through this mixture whereby the conversion into phosphorus-chlorine compounds and calcium chloride takes place, giving a very good yield.

The reaction may further be accelerated by physical and mechanical influences for example actinic rays, stirring and the like.

I claim:

1. A process for obtaining phosphorus-halogen compounds from phosphates which comprises treating the phosphate with a free halogen in the presence of a reducing agent, while in the presence of a halide of a brass-forming metal as a catalyzer.

2. A process for obtaining phosphorus-halogen compounds from phosphates which comprises treating tricalcium phosphate with a free halogen in the presence of a reducing agent, while in the presence of a halide of a brass-forming metal as a catalyzer.

3. A process for obtaining phosphorus-halogen compounds from phosphates which comprises treating the phosphate with free chlorine in the presence of a reducing agent, while in the presence of a halide of a brass-forming metal as a catalyzer.

4. A process for obtaining phosphorus-halogen compounds from phosphates which comprises treating the phosphate with a free halogen in the presence of a reducing agent, while in the presence of a chloride of a brass-forming metal, which chloride is capable of acting as a catalyzer.

5. A process for obtaining phosphorus-halogen compounds from phosphates which comprises treating a mixture of calcium phosphate with free carbon in excess, with free halogen, at between an incipient red heat and a bright red heat, while in the presence of a chloride of a brass-forming metal, which chloride is capable of acting as a catalyzer.

6. A process for obtaining phosphorus-halogen compounds from phosphates which comprises treating the phosphate with a free halogen in the presence of a reducing agent, while in the presence of a halide of copper acting as a catalyzer.

7. A process for obtaining phosphorus-halogen compounds from phosphates which comprises treating tricalcium phosphate with a free halogen in the presence of a reducing agent, while in the presence of a halide of zinc acting as a catalyzer.

In testimony whereof I affix my signature.

HENRI C. J. H. GELISSEN.